UNITED STATES PATENT OFFICE.

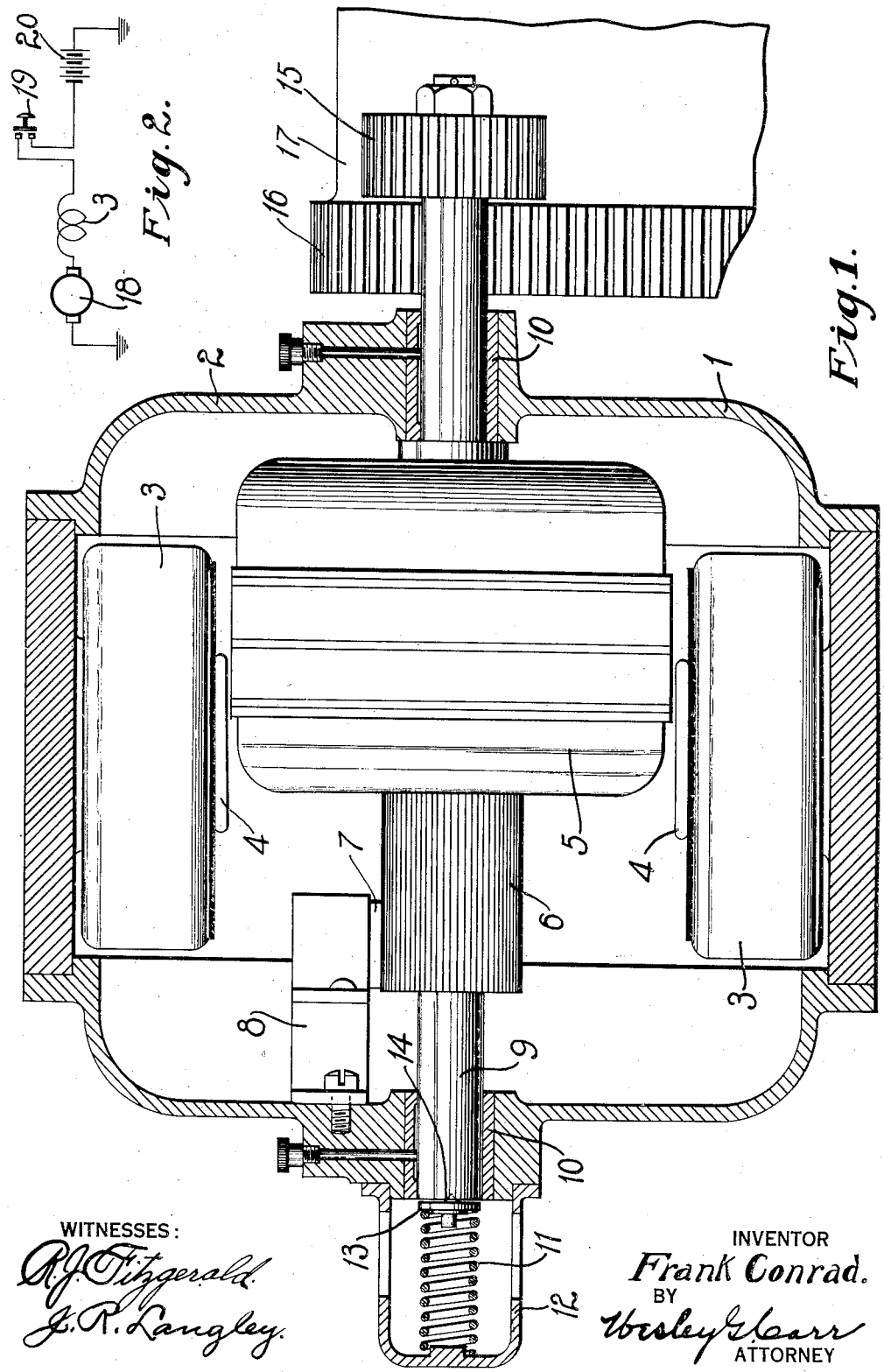

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING-MOTOR FOR GAS-ENGINES.

1,246,718. Specification of Letters Patent. Patented Nov. 13, 1917.

Application filed October 15, 1914. Serial No. 866,798.

*To all whom it may concern:*

Be it known that I, FRANK CONRAD, a citizen of the United States, and a resident of Pittsburgh, in the county of Allegheny and State of Pennsylvania, have invented a new and useful Improvement in Starting-Motors for Gas-Engines, of which the following is a specification.

My invention relates to starting motors for gas engines, and it has particular reference to electric motors having armatures that are longitudinally movable within the field magnet frames to effect the meshing of coacting gear wheels.

My invention has for its object to provide a mechanism of the character indicated above which possesses the inherent characteristics of exerting a strong magnetic force for reciprocating the motor armature and a weak magnetic force for rotating the armature until the longitudinal movement has been completed.

Motors having reciprocable armatures for the purpose above described have heretofore been provided, but they possess the disadvantage of requiring a switching mechanism for initially shunting the armature windings or for inserting considerable resistance in circuit with them while the gear wheels are being meshed. This arrangement is necessary because, in the displaced position of the armature, a relatively large portion of the core structure is between the pole pieces and a correspondingly large portion of the magnetic flux traverses a direct path between the latter. Since the force causing a longitudinal movement of the armature is produced by the flux that is deflected from its normal path by the displaced position of the armature, such force will necessarily be weak relatively to the torque that is produced by the flux traversing a direct path. When the switching mechanism above described is employed, little or no current traverses the armature winding to produce a torque for rotating the armature, and the gear wheels may be readily meshed because there is substantially no lateral pressure between the coacting teeth to retard their relative longitudinal movements.

I provide an electric motor by means of which the results above described are accomplished without the employment of auxiliary switching mechanism or resistors. The armature is so constructed that its diameter is greater, and its length is materially less than that of the corresponding parts of similar machines. In its normal or displaced position, a very small portion of the core structure of the armature is between the pole pieces. The result is that, when the field windings are energized, substantially all of the magnetic flux is deflected from the normal path between the several poles.

As is well known, magnetic flux exerts the greatest force along the line of its direction. Since substantially all of the field flux enters the armature core structure at an angle, the component of force along the line of the shaft is comparatively large and the armature is reciprocated very quickly and forcibly to its normal position. Because of the substantially entire displacement of the armature from the normal path of the flux, the portion of the flux which passes directly through the armature core is small and, accordingly, the torque is correspondingly weak until the armature approaches its normal position. The gear wheels are, therefore, readily meshed when the main circuit of the motor is closed in the usual manner.

The details of my invention will be described in connection with the accompanying drawing in which Figure 1 is a side view, partially in elevation and partially in section, of a dynamo-electric machine constructed in accordance with my invention and a pair of coacting gear wheels. Fig. 2 is a diagrammatic view of circuits and apparatus employed in connection with my invention.

A motor 1 has a field magnet frame 2 which is secured to any suitable stationary part of the automobile structure (not shown). The motor has any convenient number of pole pieces 4 which are provided with series-connected field coils 3. The rotatable portion of the dynamo-electric machine comprises an armature having a laminated core structure 5, the diameter of which considerably exceeds its length. The commutator cylinder 6 is of such a length that the brushes 7, only one of which is shown, are in engagement with it throughout the longitudinal movement of the armature. The brushes 7 are carried by brush holders 8 that are secured to an end bell of the field magnet frame.

The armature shaft 9 is arranged for longitudinal movement in bearings 10. A compression spring 11, one end of which bears against a tubular cap 12 and the other end of which bears against a collar 13, operates to maintain the armature in a displaced position relatively to the pole pieces, as illustrated. The collar 13 is provided with a tapered projection 14 which has a bearing in the end of the armature shaft. A pinion 15, which is mounted on the opposite end of the armature shaft, coacts with gear teeth 16 on the engine fly wheel 17.

Referring to Fig. 2, in which the circuits and apparatus employed in connection with my invention are diagrammatically shown, the circuit of the motor comprises the armature winding indicated at 18, the series field winding 3, a push button switch 19 and a storage battery 20.

It may be assumed that the various parts occupy their respective illustrated positions with the armature in its displaced position and the pinion 15 out of engagement with the gear teeth 16. When it is desired to start the engine, the push button switch 19 is actuated to close the motor circuit. Current then traverses the series circuit above described to energize the respective windings of the motor. Because of the comparatively small portion of the core structure 5 that lies directly between the pole pieces 4, the greater portion of the magnetic flux emanating from the pole pieces 4 will be deflected from a direct path between them. Only a small portion of the magnetic flux follows the normal direct path through the armature.

Since the greater portion of the flux enters the armature at an angle, the force which tends to actuate the armature member longitudinally to its central position between the pole pieces is relatively strong. The torque produced by the portion of the flux which passes directly through the armature will, on the other hand, be relatively weak. Accordingly, the armature will be quickly and forcibly actuated to the left, as shown. The pinion 15 meshes readily with the gear teeth 16 because the weak torque produces only a slow rotative movement and the lateral pressure between the coacting gear teeth is relatively small.

As the armature reciprocates to its normal position, the portion of flux entering it at an angle is decreased and the flux traversing the direct path is increased, so that the torque of the motor increases in accordance with the position of the armature. When the armature is in its central position relatively to the field magnet poles, the torque is high because of the comparatively large diameter of the armature. When the motor is driving the engine, a very heavy current traverses the motor windings, and the poles are sufficiently energized to retain the armature in its central position against the force of the spring 11.

When the engine starts under its own power, the operator releases the switch 19 to open the motor circuit. The poles are thereby deënergized and the spring 11, which has been compressed, returns the armature to its displaced position with the pinion 15 disengaged from the gear teeth 16.

If the motor circuit is not opened immediately upon the starting of the engine, no harm can result. As the engine accelerates, the motor is driven at a correspondingly increased speed and its counter electromotive force is thereby increased to reduce the current traversing its windings to such a value that the axial pull exerted by the poles is less than the force of the spring 11. The armature is then shifted by the spring to its displaced position, and the pinion 15 is disengaged from the gear teeth 16.

It will be noted that I provide a motor which operates automatically to control the engagement of coacting gear wheels. The torque of the motor is initially very low while the magnetic force along the armature axis is relatively high. The normal torque of the motor is applied when the pinion is fully meshed with the gear teeth. Since these operating characteristics are inherent in the structure of the motor, the use of auxiliary switching mechanisms and resistors is avoided.

I claim as my invention:

1. In a starting mechanism, the combination with a pair of coacting gear wheels and a field-magnet frame having a plurality of pole pieces, of a rotatable armature, the diameter of which exceeds its length, mounted for longitudinal movement in said frame and connected to one of said gear wheels, and a spring for normally retaining said armature in a displaced position relatively to said pole pieces whereby, when the normal circuit of the dynamo-electric machine is completed, a relatively strong force actuates the armature longitudinally and a relatively weak force tends to rotate said armature to effect the meshing of said gear wheels.

2. In a starting mechanism, the combination with a pair of coacting gear wheels and a field-magnet frame having a plurality of pole pieces, of a longitudinally movable armature rotatably mounted therein and connected to one of said gear wheels, the diameter of said armature exceeding its length, and a spring for normally retaining said armature in a displaced position with a relatively small portion of its core member between said pole pieces whereby, when the normal circuit of the dynamo-electric machine is completed, a relatively strong force actuates the armature longitudinally and a relatively weak force tends to rotate said armature to effect the meshing of said gear wheels.

In testimony whereof, I have hereunto subscribed my name this 14th day of Oct., 1914.

FRANK CONRAD

Witnesses:
F. A. JORDAN,
B. B. HINES.